United States Patent [19]

Ezuriko

[11] Patent Number: 5,794,160
[45] Date of Patent: Aug. 11, 1998

[54] DATA COMMUNICATION INTERFACE HAVING STATUS MEMORY FOR STORING CONDITIONS OF RADIO CHANNEL

[75] Inventor: Hiroshi Ezuriko, Tokyo, Japan

[73] Assignee: NEC Corporation, Tokyo, Japan

[21] Appl. No.: 631,561

[22] Filed: Apr. 12, 1996

[30] Foreign Application Priority Data

Apr. 14, 1995 [JP] Japan .................................. 7-113604

[51] Int. Cl.⁶ ..................................................... H04Q 7/32
[52] U.S. Cl. .............................................. 455/557; 455/556
[58] Field of Search ...................................... 455/557, 556, 455/466, 559, 418

[56] References Cited

U.S. PATENT DOCUMENTS

| | | | |
|---|---|---|---|
| 4,694,473 | 9/1987 | Etoh | 455/557 |
| 4,991,201 | 2/1991 | Tseng | 455/557 |
| 5,249,218 | 9/1993 | Sainton | 455/557 |
| 5,333,177 | 7/1994 | Braitberg et al. | 455/559 |
| 5,353,334 | 10/1994 | O'Sullivan | 455/557 |
| 5,367,563 | 11/1994 | Sainton | 455/418 |
| 5,408,520 | 4/1995 | Clark et al. | 455/557 |
| 5,428,671 | 6/1995 | Dykes et al. | 455/557 |
| 5,574,773 | 11/1996 | Grob et al. | 455/466 |
| 5,657,371 | 8/1997 | Suomi et al. | 455/557 |

FOREIGN PATENT DOCUMENTS 5-327791  12/1993  Japan .

OTHER PUBLICATIONS

Li, M. et al., "Rejection of CW Interference in QPSK Systems Using Decision–Feedback Filters", IEEE Transactions on Communications, vol. COM–31, No. 4, Apr. 1983.

*Primary Examiner*—Dwayne D. Bost
*Assistant Examiner*—Thomas Bethea, Jr.
*Attorney, Agent, or Firm*—Ostrolenk, Faber, Gerb & Soffen, LLP

[57]  ABSTRACT

A data communication interface for interfacing between a digital radio telephone and computer includes a first protocol converter for converting forward channel data from the telephone into a form usable by the computer and a second protocol converter for converting reverse channel data from the computer into a form usable by the telephone. The digital telephone produces a plurality of status signals indicating the operating states of the telephone. The interface receives each status signal from the telephone and stores it in a status memory. When a command signal is received from the computer, the interface makes a search through the status memory for one corresponding to the received command signal. The detected status signal is applied to the computer and displayed.

6 Claims, 5 Drawing Sheets

DATA COMMUNICATION INTERFACE HAVING STATUS MEMORY FOR STORING CONDITIONS OF RADIO CHANNEL

BACKGROUND OF THE INVENTION

1. Field of the Invention

The present invention relates generally to data communications and more specifically to a data communication interface for interfacing between a mobile telephone and a computer.

2. Description of the Related Art

As typically shown and described in Japanese Provisional Patent Publication Hei-5-327791, a data communication modem interface card is capable of interfacing between an analog cellular mobile telephone and a computer for transmission and reception of computer-generated text and scanned data to and from a remote terminal using a radio channel established between the telephone and a cell-site station. However, due to the varying quality of a channel with distance from the nearby cell site and due to the limited battery power, the user has to go through the cumbersome process of checking each of the operating states of the telephone before a data communication begins.

SUMMARY OF THE INVENTION

It is therefore an object of the present invention to provide an interface unit that automatically provides a check on the operating states of a digital mobile telephone before a data communication begins.

According to the present invention there is provided a data communication interface for interfacing between a digital radio telephone and a computer. The interface comprises a first protocol converter for converting forward channel data from the telephone into a form usable by the computer and applying the converted forward channel data to the computer and a second protocol converter for converting reverse channel data from the computer into a form usable by the telephone and applying the converted reverse channel data to the telephone. The digital telephone produces a plurality of status signals indicating the operating states of the telephone. The interface receives each status signal from the telephone and stores it into a status memory. When a command signal is received from the computer, the interface makes a search through the status memory for a stored status signal corresponding to the received command signal. The detected status signal is applied to the computer where it is put on display.

Preferably, a header portion of the received status signal is stored in a first shirt register and a plurality of signal patterns are stored in a pattern memory. The signal patterns are read in sequence out of the memory into a second shift register. A comparator produces an output when there is a match between the header portion of the status signal in the first shift register and signal pattern in the second shift register. In response to the output of the comparator, a data portion of the received status signal is stored in the status memory.

BRIEF DESCRIPTION OF THE DRAWINGS

The present invention will be described in further detail with reference to the accompanying drawings, in which.

DETAILED DESCRIPTION

Figure 1:
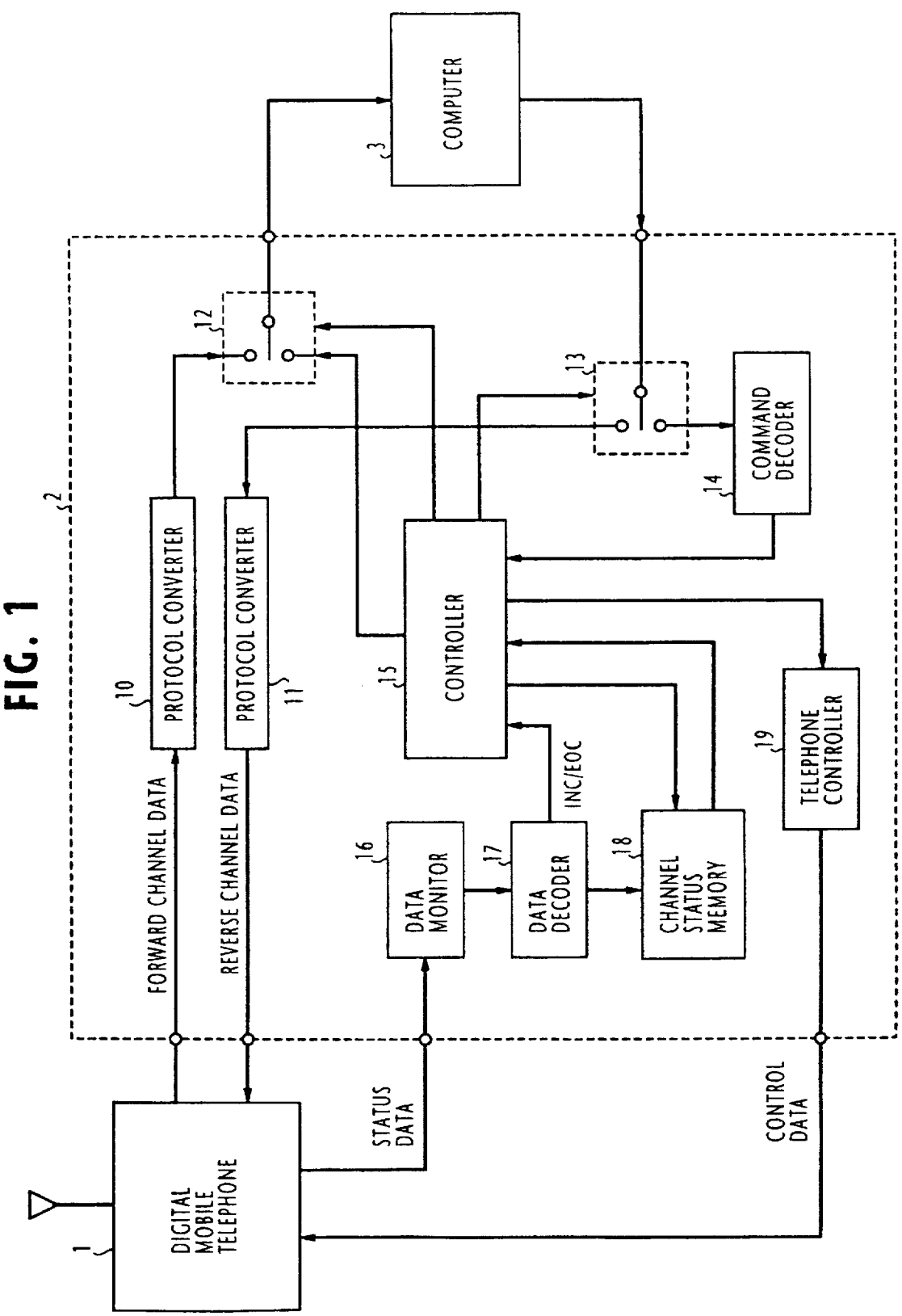
FIG. 1 is a block diagram of a data communication interface card of the present invention together with a digital mobile telephone and a computer.

An interface card of the present invention as indicated by numeral 2 in FIG. 1 is intended to serve as a two-way data communication interface between a digital hand-held radio telephone 1 and a computer 3 such as battery-operated lap-top computers, desk-top computers or workstations.

Radio telephone 1 established a TDMA-TDD (time division multiple access-time division duplex) channel with a cell site station for receiving forward channel data from the cell site and transmitting reverse channel data on an assigned time slot of the time division duplex channel. Radio telephone 1 produces status data such as alert signal notifying the arrival of a call from a cell site, proceed to-send signal indicating that a destination terminal goes off-hook, field intensity signal representing the field strength of signal from the home cell site, and border-line signal indicative of whether the radio telephone is within the coverage of the home cell site or not. The status signals also include a battery voltage indication. Radio telephone 1 is responsive to control data such a destination telephone number, off-hook signal to establish a connection and on-hook signal to clear down the connection.

Computer 3 is connected to the interface card 2 using the standard line terminals such as RS-232C. Alternatively, the interface between them is implemented with a PC card interface (I/O card) of the PCMCIA (Personal Computer Memory Card International Association) standard on the side of the interface card 2 and a PC card slot of the PCMCIA standard on the side of computer 3.

Interface card 2 includes protocol converters 10 and 11 connected to the telephone 1. The forward channel data from the cell site is converted in the converter 10 to the protocol of the computer 3 and reverse channel data from the computer is converted to the protocol of the cell site by the converter 11. The output of protocol converter 10 is supplied via a switch 12 to computer 3 and the reverse channel data from computer 3 is supplied via a switch 13 to the protocol converter 11. A command decoder 14 is provided for decoding a command signal supplied from the computer 3 via switch 13. These switches are operated by a controller 15 to which the output of command decoder 14 is supplied.

A data monitor 16 is provided in the interface card 2 to receive and store status data from telephone 1. The data stored in data monitor 16 is supplied to a data decoder 17 where it is analyzed. If the status data indicates the arrival of an incoming call or the end of communication, it is supplied to the controller 15. If the status data is indicative of a status of the TDMA channel established with the home cell site, it is stored in a channel status memory 18 which is also accessed by controller 15 to transfer data to computer 13 in accordance with the output of command decoder 14. A telephone controller 19 is responsive to a command signal from the controller 15 for supplying a control signal to the telephone 1. This will become clear later when the operation of controller 15 is discussed with the aid of a flowchart shown in FIG. 6.

Figure 2:
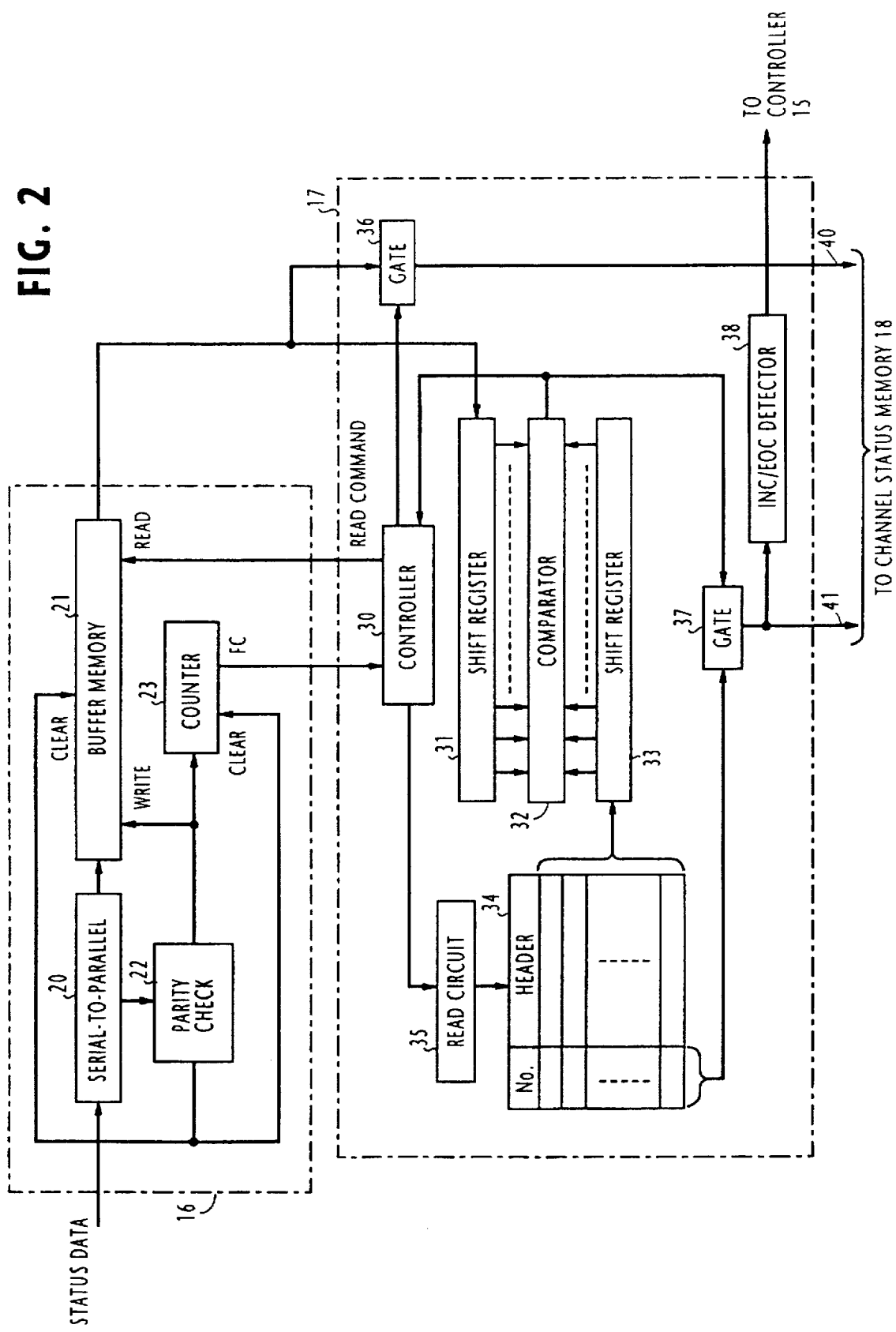
FIG. 2 is a block diagram of the data monitor and data decoder of FIG. 1.

In FIG. 2, details of data monitor 16 and data decoder 17 are illustrated. In data monitory 16, the status data from telephone 1 is entered to a serial-to-parallel converter 20 in serial form where it is converted to byte parallel data. The status data comprises header bytes and information bytes. A parity check circuit 22 is connected to the serial-to-parallel converter 20 to provide error check on each byte of the received status data. If no error exists in a byte, the parity check circuit 22 increments a counter 23 by one and stores the error-free byte in a buffer memory 21. If an error is detected in a byte, the parity check circuit 22 clears buffer 21 and counter 23. When counter 23 is incremented to its full count value, it triggers the data decoder 17, indicating that a sequence of status data is stored in buffer memory 21.

In data decoder 17, the full-count output of counter 23 is received by a controller 30, the latter produces a read command signal which is used to read the stored header bytes from buffer memory 21 into a shift register 31. The output of buffer memory 21 is also connected to a gate 36 which is gated on by a signal from controller 30 to supply information bytes that follow the header bytes stored in shift register 31.

All stages of the shift register 31 are connected to a comparator 32. A plurality of header patterns are stored in a memory 34 in locations corresponding to serial numbers which are used as a tag of each header pattern. The header patterns are sequentially read out of memory 34 by a read circuit 34 when it is enabled by the controller 30. The header patterns are sequentially supplied to a shift register 33 whose stages are all connected to the comparator 32 for making bit-by-bit comparisons between the header bytes stored in shift register 31 and each header pattern stored in shift register 33. When there is a match, comparator 32 applies an output to controller 30 and to a gate 37. Concurrently with the readout of each header pattern, a corresponding tag is supplied from memory 34 to the gate 37.

When there is a match between a received header and header pattern in memory 34, controller 30 allows the information bytes that follow the matched header to be applied through the gate 40 to the channel status memory 18 through line 40. Concurrently, the tag corresponding to the matched header is allowed to pass through the gate 37 and applied through line 41 to the channel status memory. The output of gate 37 is also supplied to a detector 38 whose output is connected to the controller 15. Detector 38 produces a signal INC indicating the arrival of an incoming call or a signal EOC indicating the end of a communication when a corresponding tag is received. The operation of the controller 30 will become clear later when it is discussed with the aid of a flowchart shown in FIG. 5.

Figure 3:
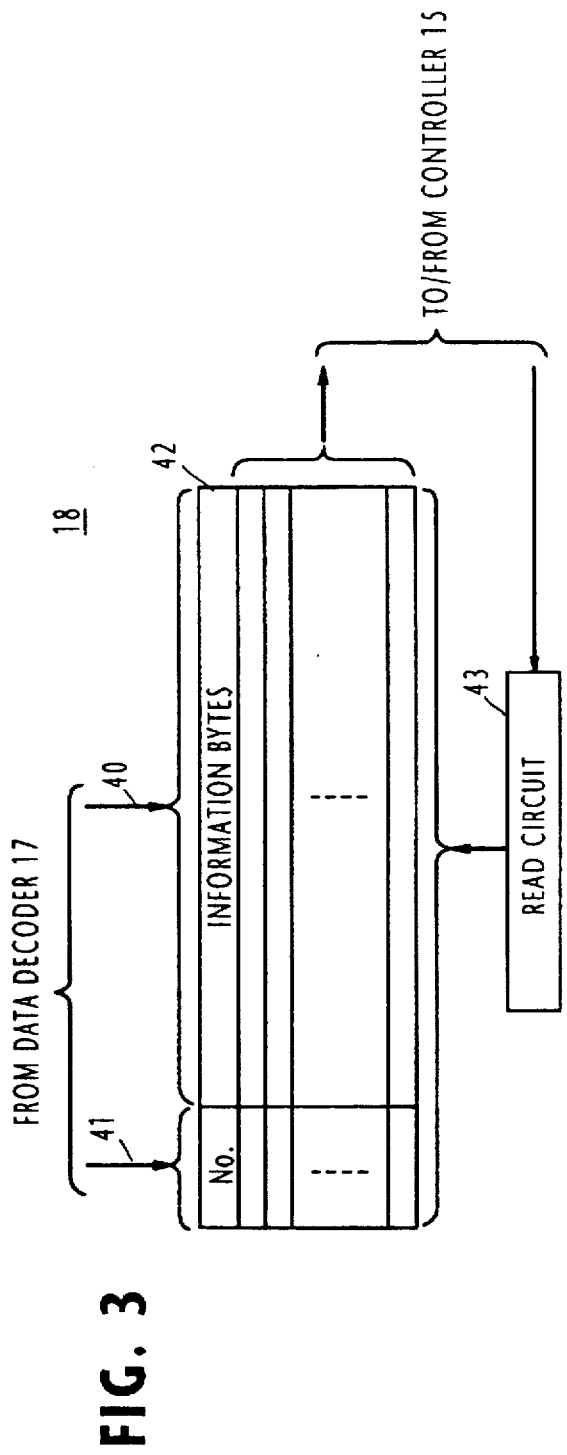
FIG. 3 is a block diagram of the channel status memory of FIG. 1.
Figure 4:
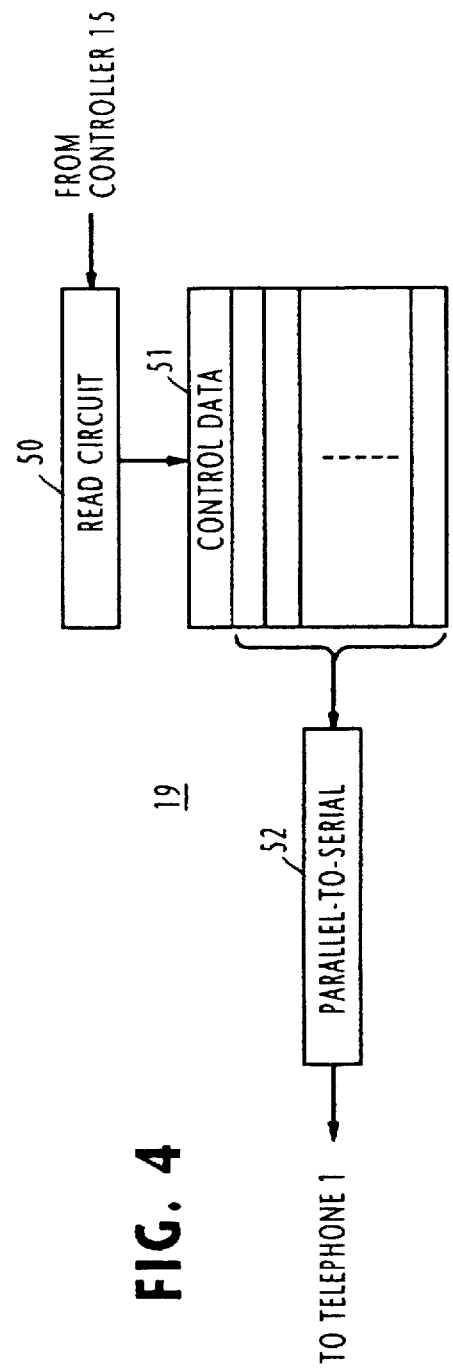
FIG. 4 is a block diagram of the telephone controller of FIG. 1.

As shown in FIG. 3, the channel status memory 18 comprises a memory 42 and a read circuit 43. The information bytes and the corresponding tag data from data decoder 17 are stored into a location of memory 42. Read circuit 43 is responsive to an address signal from controller 15 to read a set of information bytes and a tag from memory 42. In FIG. 4, the telephone controller 19 includes a read circuit 50, a memory 51 in which a set of predetermined control data is stored. In response to a command signal supplied to read circuit 50 from controller 15, one of the stored control data is read from memory 51 and converted in serial form by a parallel-to-serial converter 52 and supplied to the telephone 1.

Figure 5:
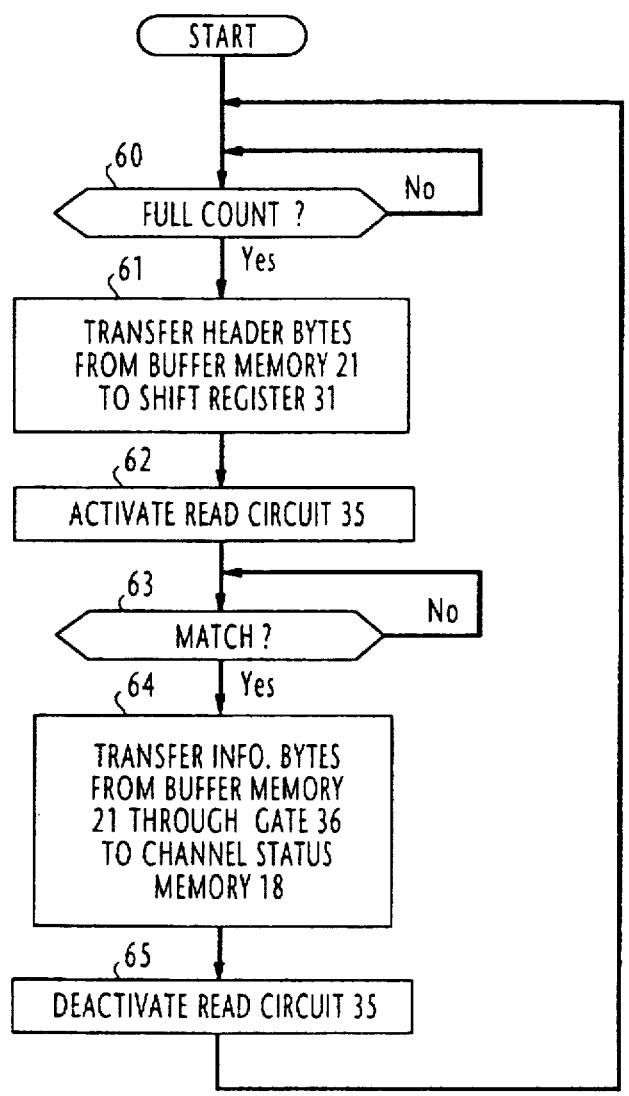
FIG. 5 is a flowchart of the operation of the controller of the data decoder of FIG. 2.

Referring to FIG. 5, at periodic intervals, the operation of the controller 30 starts when the counter 23 of data monitor 16 reaches its full count (step 60). Flow proceeds to step 61 to supply a read command to the buffer memory 21 to transfer the header bytes of the stored status data to shift register 31. When the header bytes are stored into shift register 31, controller 30 activates the read circuit 35 (step 62), whereby shift register 33 are sequentially loaded with the header patterns of memory 34 and the corresponding tags (serial numbers) are sequentially supplied to gate 37. When the comparator 32 detects a match (step 63), flow proceeds to step 64 where controller 30 enables the gate 36 to pass the subsequent information bytes to the channel status memory 18, while at the same time the gate 37 is opened to pass the tag data corresponding to the matched header pattern to the channel status memory. Flow proceeds to step 65 to deactivate the read circuit 35 and returns to step 60 to repeat the same process on the next status data. In this way, the contents of the channel status memory 18 are periodically updated.

Figure 6:
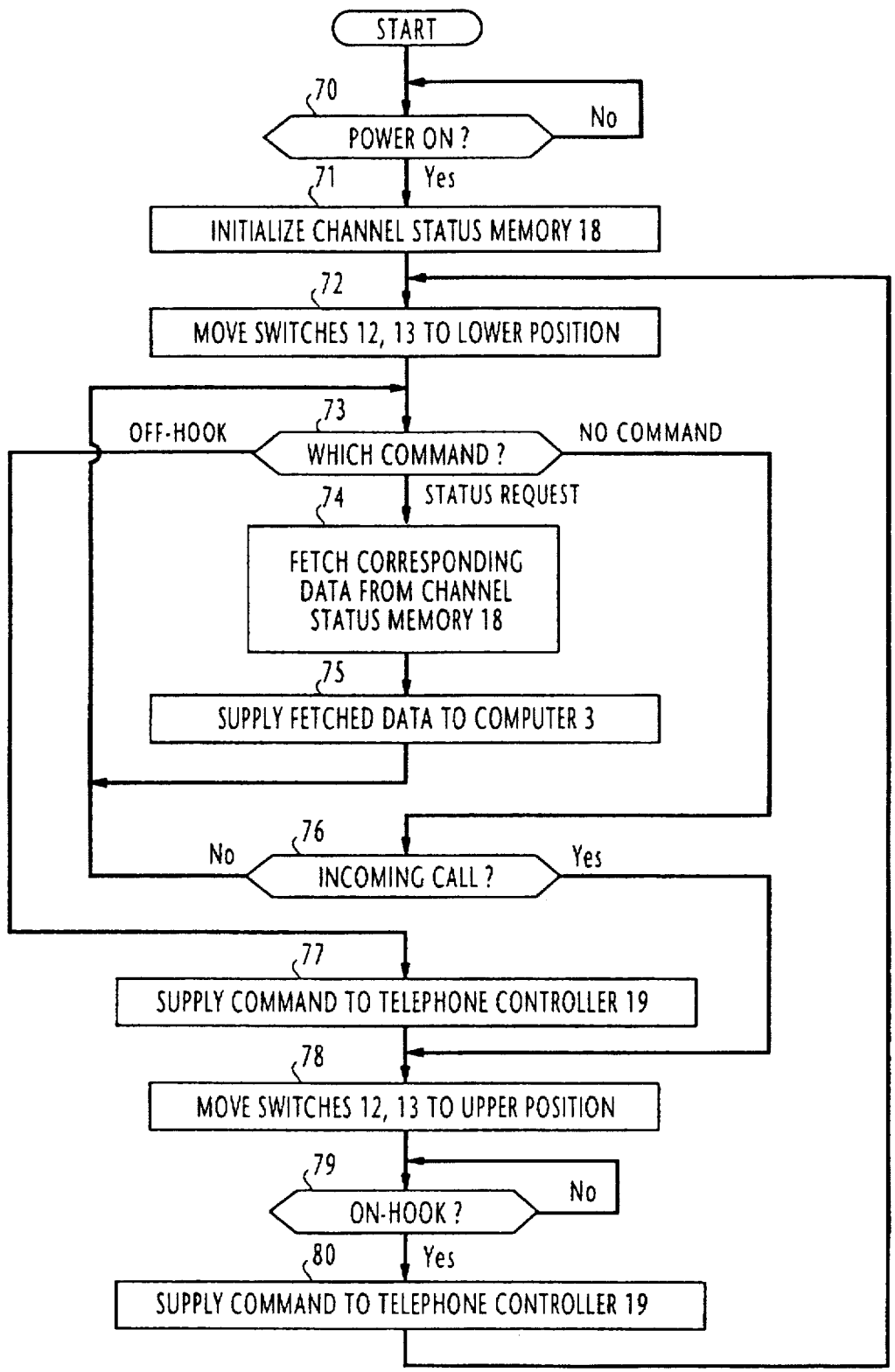
FIG. 6 is a flowchart of the operation of the controller of the interface card of FIG. 1.

In FIG. 6, the operation of the controller 15 of interface card 2 beings when the card is powered on (step 70). Flow proceeds to step 71 where the controller 15 initializes the channel status memory 18. Switches 12 and 13 are then moved to the lower position (step 72) for connecting the controller 15 to the input of computer 3 and the output of computer 3 to the command decoder 14. Flow proceeds to the decision step 73 where the controller 15 examines the output of the command decoder 14. If the output of decoder 14 represents a status request, flow proceeds from step 73 to step 74 where the controller 15 uses the status request as an address signal to search through the channel status memory 18 for corresponding information bytes and tag and supplies these data to computer 3 via switch 12. In response, computer 3 provides a display of these data on its screen and removes the request from the command decoder 14. Following the execution of step 75, flow returns to step 73 to repeat the process. If the output of decoder 14 indicates that an off-hook command is issued from computer 3, flow proceeds from step 73 to step 77 to supply the off-hook command to the telephone controller 19 so that a connection is established to a distant terminal via the home cell site. At step 78, switches 12 and 13 are moved to the upper position for connecting the output of protocol converter 10 to the input of computer 3 and output of computer 3 to the input of protocol converter 11 to allow a data communication to begin. At step 79, the outputs of command decoder 14 and INC/EOC detector of decoder 17 are checked to see if there is an on-hook condition. If the decision is affirmative at step 79, flow proceeds to step 80 to supply an appropriate command to the telephone controller 19 to clear down the connection, and flow returns to step 72.

If no command is detected at the output of decoder 14 at step 73, flow proceeds to step 76 where the controller 15 checks the output of the INC/EOC detector of decoder 17 to see if it is indicative of the arrival of an incoming call. If the decision is negative at step 76, flow returns to step 73 to repeat the process. If there is an incoming call, flow proceeds from step 76 to step 78 to move the switches 12, 13 to the upper position.

It is seen from the foregoing description that the interface unit of the present invention eliminates the cumbersome process of manually checking each operating state of a digital mobile telephone before a data communication begins.

What is claimed is:

1. A data communication interface for interfacing between a digital radio telephone and computer, comprising:

a first protocol converter for converting forward channel data from the telephone into a form usable by the computer and applying the converted forward channel data to the computer;

a second protocol converter for converting reverse channel data from the computer into a form usable by the telephone and applying the converted reverse channel data to the telephone;

a status memory;

first means for receiving a status signal at periodic intervals from the telephone and storing the received signal into said status memory, said status signal representing one of a plurality of operating states of said telephone; and second means for receiving a command signal from the computer, making a search through said status memory and applying a stored status signal corresponding to the received command signal to the computer as display data.

2. A data communication interface as claimed in claim 1, wherein the first means comprises:

a pattern memory for storing a plurality of signal patterns;

means for reading said signal patterns in sequence from the pattern memory;

a first shift register for storing a header portion of the received status signal;

a second shift register for storing each of said signal patterns from said pattern memory;

a comparator for producing an output when there is a match between the header portion in the first shift register and a signal pattern in the second shift register; and means for supplying a data portion of the received status signal to said status memory in response to the output of the comparator.

3. A data communication interface as claimed in claim 1, wherein the first means comprises:

a pattern memory for storing a plurality of signal patterns and a plurality of tags corresponding respectively to said signal patterns;

means for reading said signal patterns and said tags in sequence from a pattern memory;

a first shift register for storing a header portion of the received status signal;

a second shift register for storing each of said signal patterns from said pattern memory;

a comparator for producing an output when there is a match between the header portion of the status signal in the first shift register and a signal pattern in the second shift register; and means for supplying a data portion of the received status signal and a corresponding one of said tags to said status memory in response to the output of the comparator.

4. A data communication interface as claimed in claim 3, wherein the second means comprises means foe making a search through the status memory to detect a remainder portion of the received status signal and a tag corresponding to the command signal and supplying the detected remainder portion and the tag to the computer.

5. In a data communication interface for interfacing between a digital radio telephone and a computer, said interface including a first protocol converter for converting forward channel data from the telephone into a form usable by the computer and applying the converted forward channel data to the computer and a second protocol converter for converting reverse channel data from the computer into a form usable by the telephone and applying the converted reverse channel data to the telephone, a method comprising the steps of:

a) producing a status signal at said telephone, the status signal indicating one of a plurality of operating states of the telephone;

b) receiving said status signal at periodic intervals from the telephone;

c) storing the received signal into a status memory;

d) receiving a command signal from the computer; and e) making a search through said status memory and applying a stored status signal corresponding to the received command signal to the computer as display data.

6. A method as claimed in claim 5, wherein the step (c) comprises the steps of:

$c_1$) storing a plurality of signal patterns in a pattern memory;

$c_2$) reading said signal patterns in sequence from the pattern memory;

$c_3$) comparing a header portion of the received status signal with each of said signal patterns to detect a match therebetween;

$c_4$) supplying a data portion of the received status signal to said status memory in response to the match detected by the step ($c_3$).

* * * * *